Feb. 21, 1961     H. R. MEADOWS     2,972,677

INTERFERENCE DETECTING CIRCUIT

Filed Dec. 4, 1957

Inventor:
Harley R. Meadows,
by Hust & Drish
Attorneys

United States Patent Office 2,972,677
Patented Feb. 21, 1961

2,972,677
INTERFERENCE DETECTING CIRCUIT

Harley R. Meadows, Fort Wayne, Ind., assignor to International Telephone and Telegraph Corporation Filed Dec. 4, 1957, Ser. No. 700,586
3 Claims. (Cl. 250—20)

This invention relates to circuits for detecting interference and more particularly to a circuit for detecting interference in the presence of an intelligence-conveying signal.

The presence of random interference noise superimposed upon a received radio signal may provide an undesirably distorted output signal. Many circuits have been proposed for reducing interference in the presence of an intelligence-bearing signal, however there are instances where it is desirable to detect the interference or noise pulses alone so that the detected noise signal may be utilized in subsequent circuitry for blanking purposes. Previous circuits known to the applicant for detecting a noise pulse alone have utilized a fixed slicing or limiting level and thus have only detected such noise pulses which have an amplitude greater than the peak signal amplitude. Random noise pulses may, however, appear superimposed upon an amplitude modulated signal and have an amplitude less than the peak amplitude of the intelligence-bearing signal. It is therefore desirable to provide a circuit which will detect random noise pulses of either polarity which are superimposed upon an amplitude modulated signal, such circuit being effective to detect noise pulses which have amplitudes less than the peak amplitude of the intelligence signal.

In the preferred embodiment of my invention, I provide phase splitting means having its input circuit connected to receive the amplitude modulated signal and having two output circuits; one of the two output circuits has a resultant signal impressed thereon responsive to and in phase with the input signal while the other output circuit has a resultant signal impressed thereon responsive to the input signal but having its polarity inverted from that of the signal in the other output circuit. Detecting means polarized in the same direction are respectively connected in the output circuits of the phase splitting means thereby providing a detected output signal which defines one polarity of the modulation envelope of the input signal. Since the two signals appearing in the output circuits of the phase splitting means are respectively the inverse of each other, it will be seen that a positive-going noise pulse superimposed upon the input signal will be detected by one of the detecting means while a negative-going noise pulse will be detected by the other detecting means; in either event, the detected output signal will have the noise pulse superimposed thereon. Since the detected modulation envelope is a low-frequency component and the noise pulse superimposed thereon is a high frequency component, filtering means is connected to receive the detected signal and thereby to pass the noise pulse and suppress the detected modulation envelope.

Accordingly it is an object of my invention to provide an improved circuit for detecting noise pulses in the presence of an intelligence-bearing signal.

Another object of this invention is to provide an improved circuit for detecting random noise pulses of either polarity superimposed upon an amplitude modulated signal, the circuit being effective to detect noise pulses having an amplitude less than the peak amplitude of the signal.

A further object of this invention is to provide an improved circuit for detecting noise pulses in the presence of an intelligence-bearing signal characterized by its simplicity and minimum number of components.

The above mentioned and other features and objects of this invention and the manner of attaining them will become more apparent and the invention itself will be best understood by reference to the following description of an embodiment of the invention taken in conjunction with the accompanying drawings, wherein:

Fig. 2 also illustrates the signal appearing across the cathode output circuit of the phase splitting means;

Figure 2:
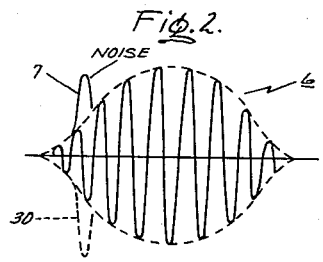
Fig. 2 is a diagrammatic illustration of an amplitude modulated input signal having a positive-going noise pulse superimposed thereon.

Referring now to the drawing, my improved noise detecting circuit, generally identified as 1, includes a phase-splitting circuit 2, shown as incorporating a triode-type vacuum tube 3 having its control grid 4 connected to input terminal 5; input terminal 5 is adapted to be connected to other circuitry to receive an amplitude modulated signal 6, as shown in Fig. 2, which may have a noise pulse 7 superimposed thereon.

Figure 3:
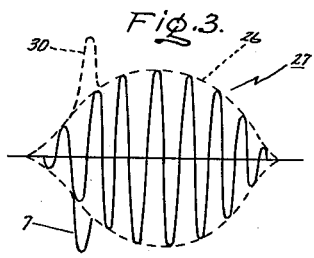
Fig. 3 is another diagrammatic illustration showing the inverted signal appearing on the plate output circuit of the phase splitter.

The cathode 8 of the phase-splitting tube 3 is connected to ground by means of a series cathode resistor 9, while the plate 10 is connected to a source of positive direct current plate potential, such as battery 11, by a series plate resistor 12. It will now be readily understood that the input signal 6 with a noise pulse 7 superimposed thereon will appear across the cathode resistor 9 and that the same signal with its polarity inverted, as shown in Fig. 3, will appear across the plate resistor 12.

A first detecting circuit 13 has its end 14 connected to cathode 8 of vacuum tube 3 and another detecting circuit 15 has its end 16 connected to plate 10 of vacuum tube 3. The other ends of detecting circuits 13 and 15 are connected to a common point 17 which in turn is connected to ground by parallel resistor 18 and capacitor 19. Detecting circuit 13 includes serially connected capacitor 20 and diode detector 21 while detector circuit 15 includes serially connected capacitor 22 and diode detector 23; it will be observed that the diode detectors 21 and 23 of the parallel detecting circuits 13 and 15 are polarized in the same direction. A resistor 24 connects the midpoint between capacitor 20 and diode detector 21 to ground while another resistor 25 connects the midpoint between capacitor 22 and diode detector 23 to ground.

Figure 4:
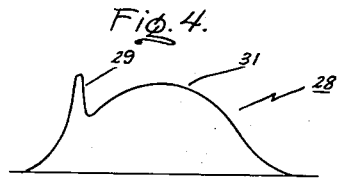
Fig. 4 is a diagrammatic illustration showing the detected signal prior to its passage through the band pass filter.
Figure 5:
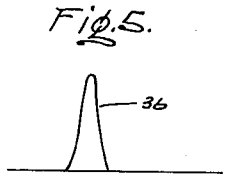
Fig. 5 is a diagrammatic illustration of the resulted detected noise pulse.

It will now be seen that with the input signal 6 also appearing across the cathode resistor 9, the positive half of that signal will be passed by the diode detector 21 in the detecting circuit 13 and will thus appear across the resistor 18 and capacitor 19. It will likewise be seen that the positive half 26 of the inverted signal 27 appearing across the plate resistor 12 will be passed by the diode detector 23 in the detecting circuit 15 and will likewise appear across the resistor 18 and the capacitor 19, thus providing a detected output signal 28 as shown in Fig. 4 which defines the positive portion of the modulation envelope of the input signal 6. It will now further be seen that if the noise pulse 7 of the input signal 6 is positive-going, as shown in Fig. 2, that pulse will be passed or detected by the diode detector 21 in the detecting circuit 13 and will thus appear superimposed upon the detected signal 28 as at 29, as shown in Fig. 4. Likewise, if the noise pulse superimposed on the input signal is negative-going, as shown in dashed lines at 30, it will appear as a positive-going pulse in the signal appearing across the plate resistor 12 and will thus be passed or detected by the diode detector 23 in the detecting circuit 15. Thus regardless of the polarity of the noise pulse superimposed upon the input signal 6, the noise pulse will appear as a positive-going pulse superimposed upon the detected output signal 28.

It will now be seen that the portion 31 of the detected output signal 28 which defines one-half the modulation envelope of the input signal 6 is a low frequency component whereas the noise pulse 29 superimposed thereon is a high frequency component. A high band pass filter 32 is therefore provided having the capacitor 33 serially connected between the common point 17 and output terminal 34 and a parallel resistor 35 connected between the output terminal 34 and ground as shown. This high band-pass filter passes the high frequency noise pulse 29 but suppresses the low frequency modulation envelope 31 so that the resulting signal occurring on the output terminal 34 is substantially only the noise pulse.

Figure 1:
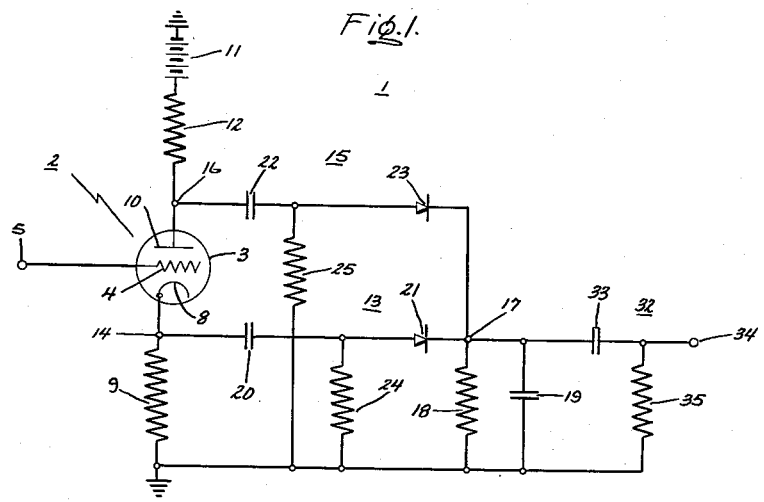
Fig. 1 is a schematic diagram illustrating the preferred embodiment of this invention.

In an actual circuit constructed in accordance with Fig. 1 for detecting random noise pulses superimposed upon amplitude modulated signals having carrier frequencies of 500 kilocycles to 30 megacycles, phase splitting tube 3 was a 6111-type triode, cathode and plate resistors 9 and 12 respectively had a resistance of 680 ohms, series capacitors 20 and 22 respectively had a capacitance of .001 microfarad, resistors 24 and 25 respectively had a resistance of 10,000 ohms, diode detectors 21 and 23 were respectively IN198, resistor 28 had a resistance of 27,000 ohms, capacitor 19 had a capacitance of 15 microfarads, capacitor 33 had a capacitance of .001 microfarad, and resistor 35 had a resistance of 33,000 ohms. It will be readily understood that the particular values of the components indicated above are given for illustrative purposes only, and that other values may be provided by one skilled in the art for detecting and filtering the particular noise signals encountered in a particular amplitude modulated signal. It will be further understood that an output pulse having a polarity opposite from that shown in Fig. 4 may be obtained merely by reversing the polarity of the diodes 21 and 23.

It will now be seen that I have provided an extremely simple circuit having a minimum number of components for detecting a random noise signal of either polarity superimposed upon an amplitude modulated intelligence-bearing signal, the resulting detected noise pulse being usable in subsequent circuitry for such purposes as providing a blanking pulse for blanking out that portion of input signal 6 which includes the superimposed noise. It has been found that my improved noise pulse detecting circuit works well with high noise pulse repetition frequencies and that with proper selection of the circuit constants, operation with average pulse repetition frequencies up to about ½ of the carrier frequency is possible and that furthermore, the noise pulses may be either random or periodic. This circuit may in addition be cascaded with another identical circuit in order to provide additional modulation suppression if desired. It has also been found that the circuit may be employed with a multiplicity of carrier frequencies existing either simultaneously or separately, and that it may be employed with keyed CW signals as well as with amplitude modulated signals; keyed CW signals are therefore considered to be the extreme case of amplitude modulated signals.

While I have described above the principles of my invention in connection with specific apparatus, it is to be clearly understood that this description is made only by way of example and not as a limitation to the scope of my invention.

What is claimed is:

1. A circuit for detecting random noise pulses of either polarity superimposed on an amplitude modulated signal comprising: a phase splitting circuit including a vacuum tube having a control grid adapted to be connected to receive an amplitude modulated input signal, said vacuum tube having a plate and cathode with plate and cathode resistors respectively connected thereto, said plate resistor being adapted to be connected to a source of positive direct current potential; a pair of detector circuits each including a diode detector connected in series therewith, one of said detector circuits having one end connected to said cathode whereby a first signal responsive to and in phase with said input signal is impressed thereon, the other of said detector circuits having one end connected to said plate whereby a second signal responsive to said input signal and having its polarity inversed from said first signal is impressed thereon, the other ends of said detector circuits being connected to a common point; a resistor and capacitor connected in parallel between said common point and the end of said cathode resistor remote from said cathode; said diode detectors being polarized in the same direction thereby providing a detected signal across said parallel connected resistor and capacitor which defines one polarity of the modulation envelope of said input signal with said noise pulse superimposed thereon; and a high band pass filter circuit connected to said common point thereby passing said noise pulses and suppressing the modulation envelope of said detected signal.

2. A circuit for detecting random noise pulses of either polarity superimposed on an amplitude modulated signal comprising: phase splitting means having an input circuit adapted to be connected to receive an amplitude modulated input signal and having two output circuits, said phase splitting means providing two signals respectively in said output circuits with one of said two signals being the inverse of the other; full-wave detector means coupled to said two output circuits for providing a detected modulation envelope with said noise pulses superimposed thereon; and band-pass means coupled to said detector means for passing only said noise pulses and suppressing the modulation envelope of said detected signal.

3. A circuit for detecting random noise pulses of either polarity superimposed on an amplitude modulated signal comprising: phase splitting means having an input circuit adapted to be connected to receive an amplitude modulated input signal and having two output circuits, one of said output circuits providing a signal in phase with said input signal and the other providing a signal with its polarity inverted from said input signal; a full-wave diode detector comprising a pair of detector circuits each having an end connected to a respective one of said phase splitting means output circuits and having their other ends connected together, each of said detector circuits including a diode detector device, said diode detector devices being polarized in the same direction to provide a detected modulation envelope with said noise pulses superimposed thereon; and a band-pass filter circuit connected to the junction of said detector circuits and arranged to pass only said noise pulses and to suppress the modulation envelope of said detected signal.

References Cited in the file of this patent

UNITED STATES PATENTS

| | | |
|---|---|---|
| 1,937,784 | Place | Dec. 5, 1933 |
| 2,354,508 | Dome | July 25, 1944 |
| 2,509,337 | Earp | May 30, 1950 |
| 2,814,671 | Adler | Nov. 26, 1957 |

FOREIGN PATENTS

| | | |
|---|---|---|
| 660,192 | Great Britain | Oct. 31, 1951 |

OTHER REFERENCES

"Theory and Applications of Electron Tubes" by H. J. Reich, McGraw-Hill Book Co., 2nd ed., 1944,